United States Patent Office 2,797,718
Patented July 2, 1957

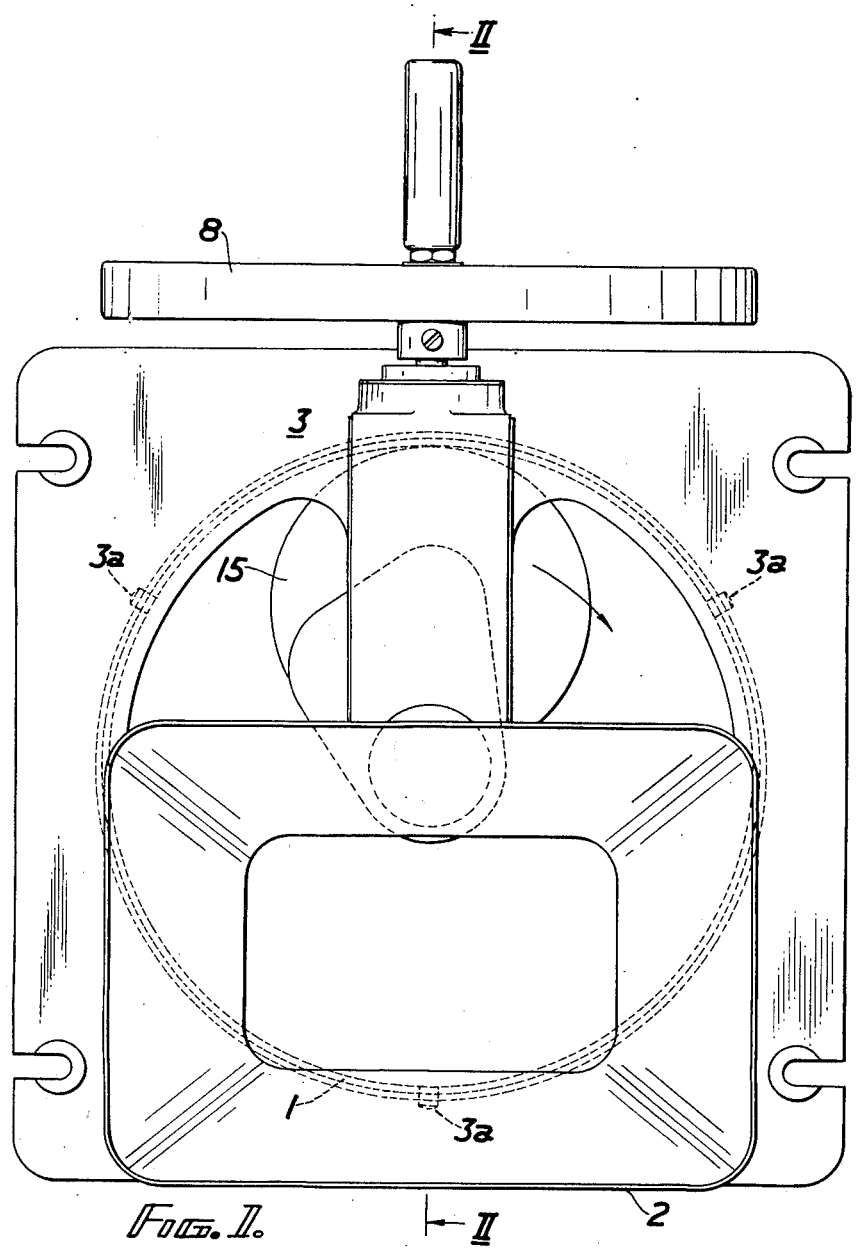

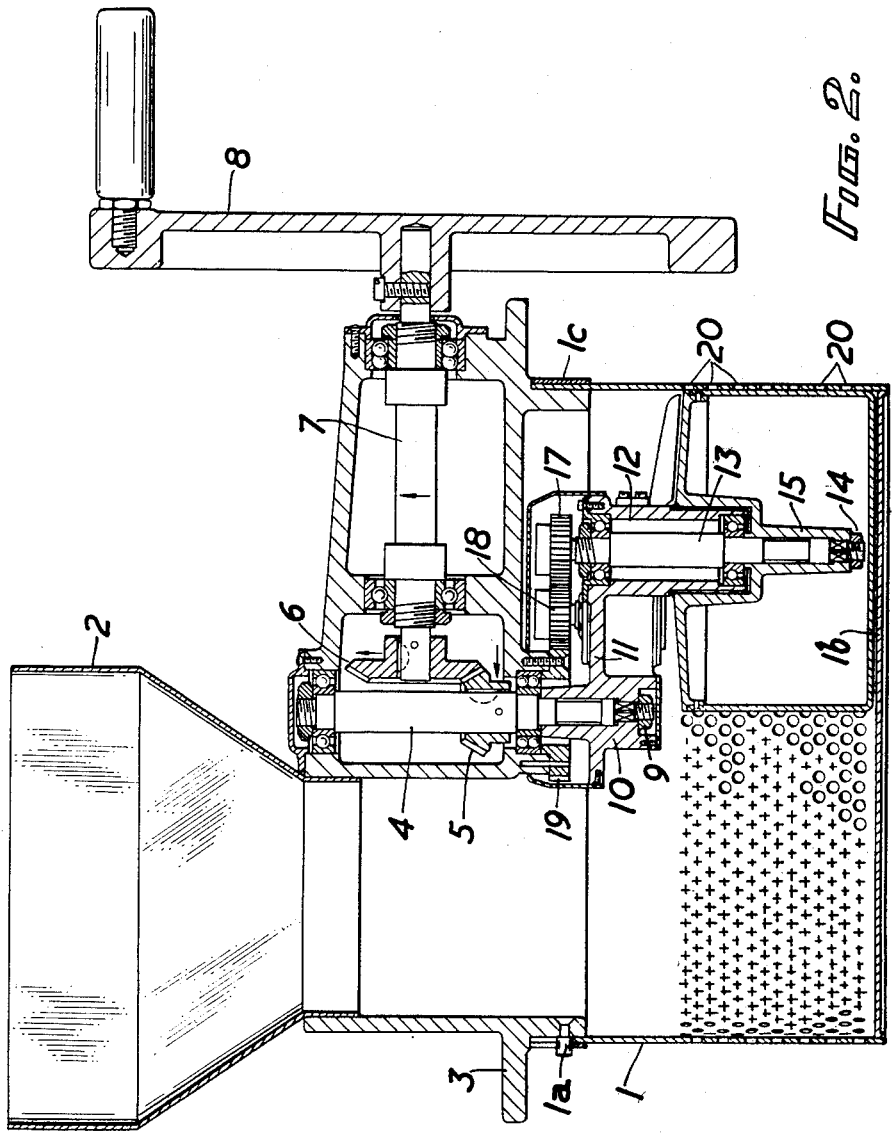

2,797,718

FOOD SIEVING AND MASHING MACHINES

William Vanson Dawkings and Doris Dawkings,
Whitstable, Kent, England

Application May 24, 1954, Serial No. 431,966

6 Claims. (Cl. 146—175)

This invention relates to food sieving and mashing machines, in which term we include machines for sieving, mashing, straining or otherwise mechanically treating foodstuffs and the like.

A machine according to the invention may be used, for example, for mashing or sieving potatoes, other vegetables or fruit, or for straining soup, fruit pulp or vegetable pulp, particularly in large kitchens or canteens where it is desired to deal with large quantities of food as quickly as possible.

In accordance with the invention there is provided a food sieving and mashing machine comprising a perforated cylindrical food container, a cylindrical roller member, a rotary member, said roller member being supported from said rotary member with the roller member adjacent the inner surface of said food container, driving means coupled to said rotary member for effecting rotation thereof to move said roller member within said container, and a gear train coupling said driving means to said roller member for rotating said roller member about its longitudinal axis during its movement within said container. As the roller member moves around the interior of the container food is forced through the perforated wall of the container and is mashed or sieved in the process. If the perforations are of suitably small size the machine may be used for straining liquid from soup, fruit pulp or vegetable pulp.

The invention will be better understood from the following detailed description of one construction of food mashing and straining machine constructed in accordance with the invention, reference being made to the accompanying drawings in which:

Fig. 1 is a plan view of the machine, whilst
Fig. 2 is a sectional elevation taken along the line II—II in Fig. 1.

Referring now to the drawings, it will be seen that the machine comprises a base 3 to the lower part of which a hollow container 1 of circular cylindrical cross section is attached by bayonet slots 1a which engage pins 3a mounted on the base 3. Foodstuff to be handled is fed through the hopper 2 and falls into the container 1. The base 3 also supports a shaft or spindle 4 whose axis co-axial with that of the container 1 and which is operatively connected through a pair of bevel gears 5 and 6 to the shaft 7 of a hand driving mechanism 8. The shaft 4 is secured by a nut 9 to a carriage 10 having a radial arm 11 terminating in a depending sleeve 12 which serves as a bearing for another shaft 13 which is secured by a nut 14 to a roller member 15, the periphery of which is in contact with the lower part of the interior cylindrical wall of the container 1. The shaft 13, which carries the roller member 15, is keyed to a planetary pinion wheel 17 which meshes with a freely mounted gear wheel 18 which in turn meshes with a sun wheel 19 fixed to the base 3. Thus, when the vertical shaft 4 is rotated by the driving mechanism 8 the roller member 15 is carried round the interior of the container 1 and is also rotated on its own axis due to the sun and planetary gear mechanism. Such gear mechanism may be so arranged that the roller member 15 makes either rolling or rubbing contact with the wall of the container 1. The container wall is provided with a set of perforations 20 where it makes contact with the roller member 15 so that as the latter is driven round the potato or other foodstuff in the container is forced through the perforations in the container wall and thoroughly mashed. Conveniently, the base 3 of the machine is mounted on a stand or framework which is provided with a large bin or other receptacle for receiving the mashed foodstuff as it is forced through the container walls.

As is described above the container 1 engages the base 3 by means of bayonet slots 1a and is therefore readily detachable. This means that a number of containers may be provided each having perforations of different size suitable for different operations. Thus, for straining soup or pulp a container with smaller size perforations may be used.

The driving mechanism may consist of a hand wheel mounted on the end of the driving shaft 7, as shown, or in the case of large installations the driving shaft may be power driven.

It will thus be seen that by means of this arrangement potato or other foodstuff can be mashed very quickly and efficiently, and by means of the feed hopper the process can be carried out continuously, thus enabling large quantities to be dealt with in the minimum time, thus saving labour and other costs and enabling large quantities of mashed potatoes to be served without difficulty.

While, however, the invention is particularly applicable to the handling of foodstuffs, it is to be understood that it may be readily applied to the handling of other material, and that if desired the base of the container may be perforated as well as its cylindrical wall.

It is desirable that the container 1 shall be of stainless steel, and a particular convenient construction for the container is to form the side wall from a strip of material appropriately perforated, the ends of the strip being united, for example by welding. The base 1b is then formed from a disc which is united to the lower edge of the strip as shown in the drawing. To reinforce the upper periphery of the container, a hoop 1c may be secured thereto.

What we claim is:

1. In a food sieving and mashing machine, a base member, a food containing drum supported from said base member, said drum having a perforated side, a food hopper upstanding from said base, said hopper having a discharge outlet terminating above said drum, a carriage rotatably mounted on said base with its axis of rotation coaxial with the axis of said drum, a radial arm extending from said carriage, a roller member mounted on said radial arm with its axis parallel to the axis of said drum and with said roller member bearing against the inner surface of said drum, driving means for rotating said carriage whereby said roller member is caused to rotate around the inner surface of said drum, a sun wheel mounted coaxially with the axis of rotation of said carriage, said sun wheel being fixed relative to said base member, a planetary wheel mounted coaxially with the axis of said roller member and rotatable therewith, and a further gear wheel coupling said sun wheel and said planetary wheel so that rotation of said carriage causes planetary motion of said planetary wheel about said sun wheel whereby said roller member rotates about its axis simultaneously with its movement around the inner surface of said drum.

2. In a food sieving and mashing machine, a base member, a perforated cylindrical food container detachably secured to said base member, a spindle rotatably supported from said base member with the axis of said spindle coaxial with the axis of said food container, a carriage mounted on said spindle, a radial arm extending outwardly from said carriage to one side of said spindle, a further spindle supported from said radial arm with its axis parallel to the axis of the first mentioned spindle and spaced apart therefrom, a roller member mounted on said further spindle with its side contacting the inner surface of said food container, a sun wheel mounted coaxially with the axis of the first mentioned spindle and fixed relative to said base member, a planetary wheel mounted coaxially with the axis of said further spindle and rotatable therewith, a further gear wheel coupling said sun wheel and said planetary wheel, and driving means in driving engagement with said first mentioned spindle whereby the latter can be rotated to cause rotation of said carriage to move said roller member around the interior of said food container, said roller member simultaneously rotating about its axis as a result of the planetary motion of said planetary wheel about said sun wheel.

3. A machine according to claim 2, in which the sun and planetary gearing coupling the first mentioned spindle and the further spindle causes the roller member to make rubbing contact with the inner surface of the food container.

4. A machine according to claim 2, in which the sun and planetary gearing coupling the first mentioned spindle and the further spindle causes the roller member to make rolling contact with the inner surface of the food container.

5. In a food sieving and mashing machine, a base member, a stationary perforated cylindrical food container detachably secured to said base member, a spindle rotatably supported from said base member with the axis of said spindle coaxial with the axis of said food container, a carriage mounted on said spindle, a radial arm extending outwardly from said carriage to one side of said spindle, a further spindle supported from said radial arm with its axis parallel to the axis of the first mentioned spindle and spaced apart therefrom, a roller member mounted on said further spindle with its side contacting the inner surface of said food container, a sun wheel mounted coaxially with the axis of the first mentioned spindle and fixed relative to said base member, a planetary wheel mounted coaxially with the axis of said further spindle and rotatable therewith, a further gear wheel coupling said sun wheel and said planetary wheel, a driving shaft, a hand wheel mounted on said shaft for manually rotating said shaft, gear wheels coupling said driving shaft with said first mentioned spindle whereby the latter can be rotated to cause rotation of said carriage to move said roller member around the interior of said food container, said roller member simultaneously rotating about its axis as a result of the planetary motion of said planetary wheel about said sun wheel.

6. In a food sieving and mashing machine according to claim 5, the food container comprising a circular perforated strip whose ends are united and a disc forming the base of the container, said disc being united to the strip adjacent the lower edge thereof.

References Cited in the file of this patent

UNITED STATES PATENTS

| | | |
|---|---|---|
| 787,018 | Wustenhofer | Apr. 11, 1905 |
| 834,507 | Carlson | Oct. 30, 1906 |
| 1,015,337 | Pancoast | Jan. 23, 1912 |

FOREIGN PATENTS

| | | |
|---|---|---|
| 109,442 | Switzerland | Aug. 17, 1925 |